(12) United States Patent
Nawashiro

(10) Patent No.: US 12,290,960 B2
(45) Date of Patent: May 6, 2025

(54) PORTABLE CUTTING MACHINE

(71) Applicant: YAMABIKO CORPORATION, Tokyo (JP)

(72) Inventor: Renpei Nawashiro, Ohme (JP)

(73) Assignee: YAMABIKO CORPORATION (JP)

(*) Notice: Subject to any disclaimer, the term of this patent is extended or adjusted under 35 U.S.C. 154(b) by 324 days.

(21) Appl. No.: 18/169,477

(22) Filed: Feb. 15, 2023

(65) Prior Publication Data

US 2023/0302684 A1   Sep. 28, 2023

(30) Foreign Application Priority Data

Mar. 24, 2022   (JP) .................. 2022-048038

(51) Int. Cl.
| | | |
|---|---|---|
| *B28D 7/00* | (2006.01) | |
| *B25F 5/02* | (2006.01) | |
| *B28D 1/22* | (2006.01) | |
| *B28D 1/24* | (2006.01) | |
| *B28D 7/02* | (2006.01) | |

(52) U.S. Cl.
CPC .................. *B28D 7/02* (2013.01); *B25F 5/02* (2013.01); *B28D 1/228* (2013.01); *B28D 1/24* (2013.01)

(58) Field of Classification Search
CPC .. B28D 7/02; B25F 5/02; B25D 1/228; B25D 1/24
See application file for complete search history.

(56) References Cited

U.S. PATENT DOCUMENTS

| | | | | |
|---|---|---|---|---|
| 4,022,182 A | * | 5/1977 | Lenkevich | ......... B23Q 11/0046 30/390 |
| 9,221,111 B2 | | 12/2015 | Elfner et al. | |
| 11,673,251 B2 | * | 6/2023 | Schneider | ............... B25F 5/008 451/449 |

(Continued)

FOREIGN PATENT DOCUMENTS

| | | |
|---|---|---|
| CN | 113766996 A | 12/2021 |
| DE | 102005060669 A1 | 6/2007 |

(Continued)

OTHER PUBLICATIONS

European Search Report issued in the corresponding European Patent Application No. 23156532.6 dated Aug. 22, 2023 (total 11 pages).

*Primary Examiner* — Omar Flores Sanchez
(74) *Attorney, Agent, or Firm* — Harness, Dickey & Pierce, P.L.C.

(57) ABSTRACT

A portable cutting machine is provided. The portable cutting machine comprises: a cutting portion including a disc-shaped cutting blade that cuts an object to be cut by rotating, and a first rotation axis that serves as a rotation center of the cutting blade; a drive portion including a drive source and a second rotation axis rotating by drive of the drive source; a transmission portion including a first pulley fixed to the first rotation axis, a second pulley fixed to the second rotation axis, and a belt looped around the first pulley and the second pulley, and configured to transmit a rotational force by the drive portion to the cutting portion; and a case including a storage space for storing the transmission portion and at least one communication portion that connect to the storage space and open to outside.

16 Claims, 6 Drawing Sheets

(56) References Cited

U.S. PATENT DOCUMENTS

| | | | |
|---|---|---|---|
| 2011/0148227 A1* | 6/2011 | Schuele | B25F 5/008 |
| | | | 310/50 |
| 2014/0024298 A1 | 1/2014 | Scholz | |
| 2015/0367432 A1* | 12/2015 | Karlsson | B23D 45/16 |
| | | | 222/191 |
| 2021/0387272 A1* | 12/2021 | Almqvist | B23D 59/02 |
| 2024/0308108 A1* | 9/2024 | Vorsmann | B28D 7/02 |
| 2024/0399612 A1* | 12/2024 | Yamanishi | B23D 45/16 |

FOREIGN PATENT DOCUMENTS

| | | |
|---|---|---|
| EP | 2832497 A1 | 2/2015 |
| EP | 3729946 A1 | 10/2020 |
| JP | 2009-039058 A | 2/2009 |
| JP | 2013-006253 A | 1/2013 |
| JP | 2017-217794 A | 12/2017 |

\* cited by examiner

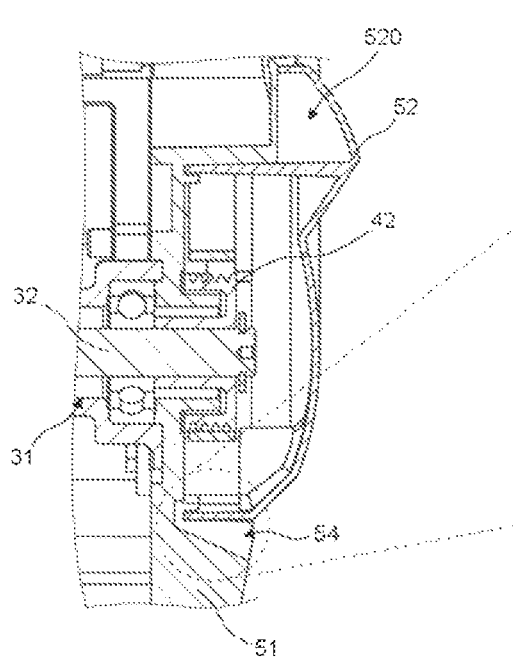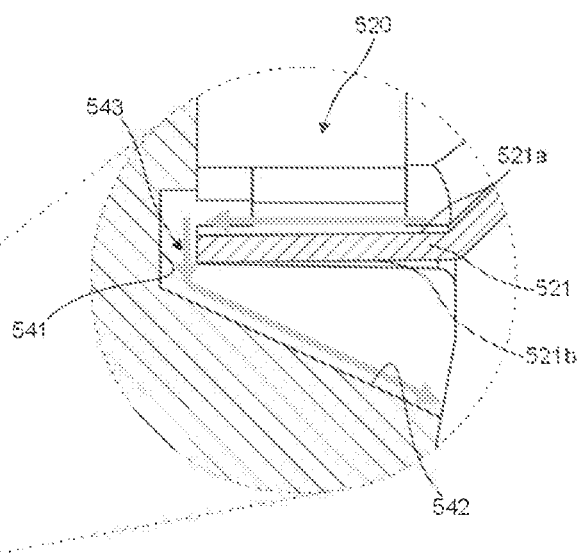

PORTABLE CUTTING MACHINE

CROSS REFERENCE TO RELATED APPLICATIONS

The present application claims priority under 35 U.S.C. § 119 to Japanese Patent Application No. 2022-048038, filed Mar. 24, 2022, the contents of which are incorporated herein by reference in their entirety.

BACKGROUND

Technical Field

The present invention relates to a portable cutting machine.

Related Art

Conventionally, when a portable cutting machine is used to cut concrete or asphalt, for instance, a cutting blade is sometimes sprayed with water for a purpose of preventing dispersal of generated dust, etc. In this case, if a sealing performance is poor, water may accumulate in a belt chamber, causing a belt to slip against a pulley, and in some cases, cutting becomes impossible. Therefore, U.S. Pat. No. 9,221,111 B2 proposes a configuration to improve sealing property of a belt chamber and prevent intrusion of water.

However, increasing the sealing property of the belt chamber may reduce ease of assembly or maintenance of the portable cutting machine, resulting in a problem of increased cost. Therefore, in view of the above circumstances, the present invention provides a portable cutting machine that can prevent a belt from slipping against a pulley while maintaining good ease of assembly or maintenance.

According to an aspect of the present invention, a portable cutting machine is provided. The portable cutting machine comprises: a cutting portion including a disc-shaped cutting blade that cuts an object to be cut by rotating, and a first rotation axis that serves as a rotation center of the cutting blade; a drive portion including a drive source and a second rotation axis rotating by drive of the drive source; a transmission portion including a first pulley fixed to the first rotation axis, a second pulley fixed to the second rotation axis, and a belt looped around the first pulley and the second pulley, and configured to transmit a rotational force by the drive portion to the cutting portion; and a case including a storage space for storing the transmission portion and at least one communication portion that connect to the storage space and open to an outside. The storage space is configured to allow liquid to enter and to allow the liquid that has entered the storage space to be discharged to outside via the communication portion.

According to such an aspect, it is possible to provide a portable cutting machine capable of preventing or suppressing accumulation of liquid in a belt chamber (a storage space of a transmission portion) without deteriorating ease of assembly or maintenance.

BRIEF DESCRIPTION OF THE DRAWINGS

FIG. 4(a) is a partial cross-sectional view of a case and FIG. 4(b) is an enlarged cross-sectional view).

DETAILED DESCRIPTION

Hereinafter, embodiments of the present invention will be described with reference to drawings. Various features described in the embodiment below can be combined with each other.

A program for realizing software in the present embodiment may be provided as a non-transitory computer-readable medium that can be read by a computer or may be provided for download from an external server or may be provided so that the program can be activated on an external computer to realize functions thereof on a client terminal (so-called cloud computing).

In the present embodiment, "portion" may include, for instance, a combination of hardware resources implemented by a circuit in a broad sense and information processing of software that can be concretely realized by these hardware resources. Further, various information is performed in the present embodiment, and the information can be represented by, for instance, physical values of signal values representing voltage and current, high and low signal values as a set of binary bits consisting of 0 or 1, or quantum superposition (so-called qubits), and communication/calculation can be performed on a circuit in a broad sense.

Further, the circuit in a broad sense is a circuit realized by combining at least an appropriate number of circuit, circuitry, processor, memory, or the like. In other words, it is a circuit that includes an application specific integrated circuit (ASIC), a programmable logic device (e.g., a simple programmable logic device (SPLD), a complex programmable logic device (CPLD), a field programmable gate array (FPGA)), or the like.

Figure 1:
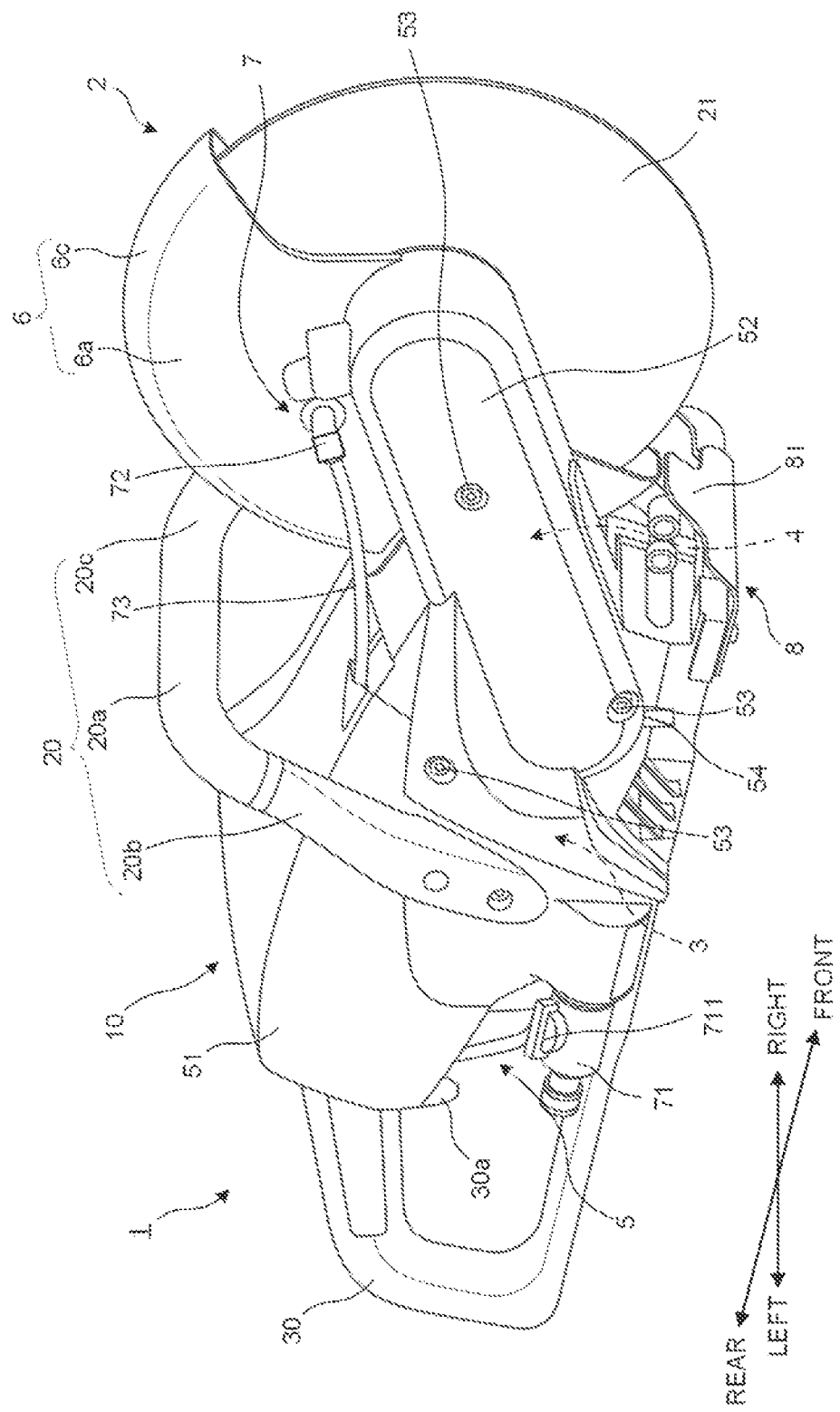
FIG. 1 is a perspective view of a portable cutting machine viewed from a right side.
Figure 2:
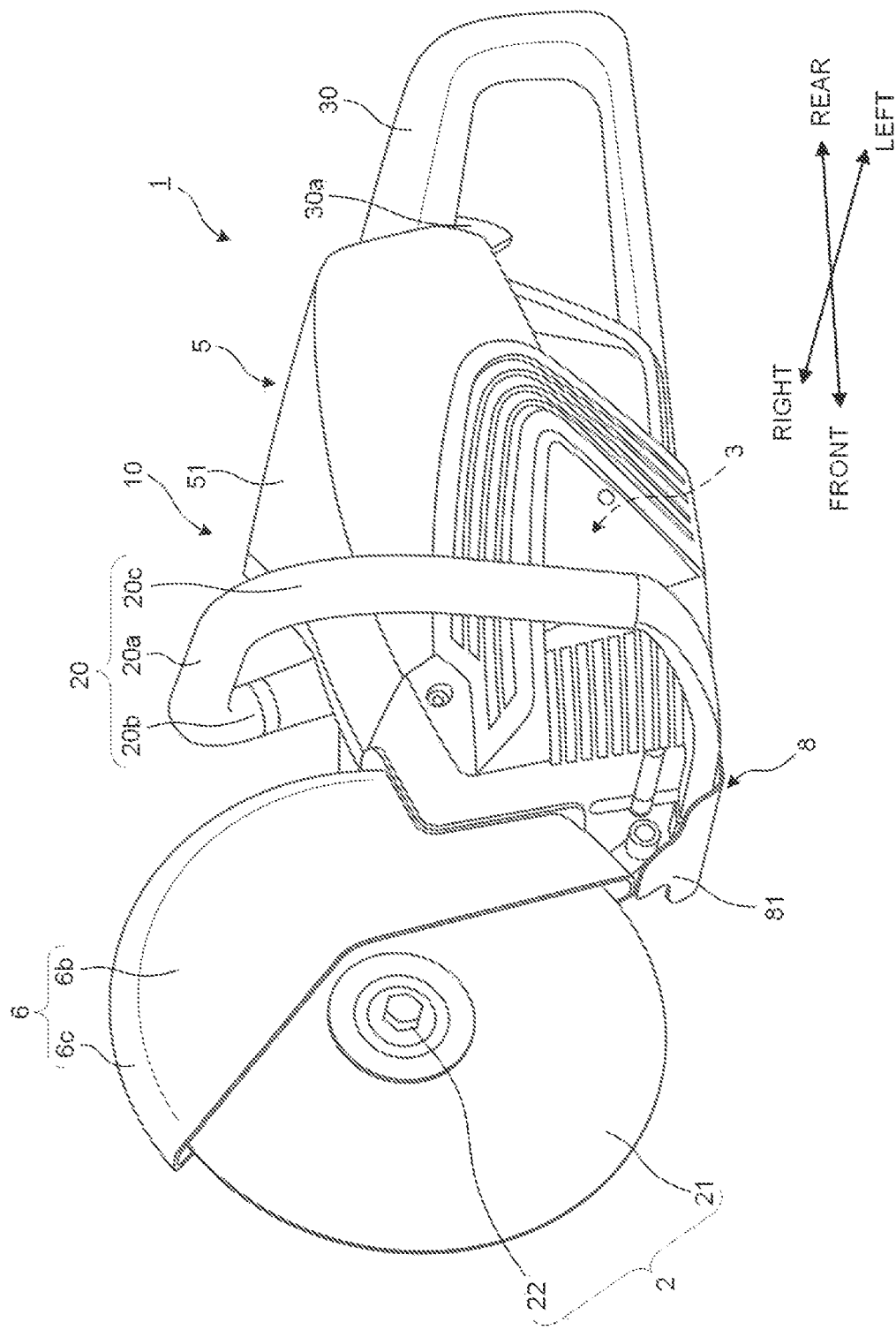
FIG. 2 is a perspective view of the portable cutting machine viewed from a left side.
Figure 3:
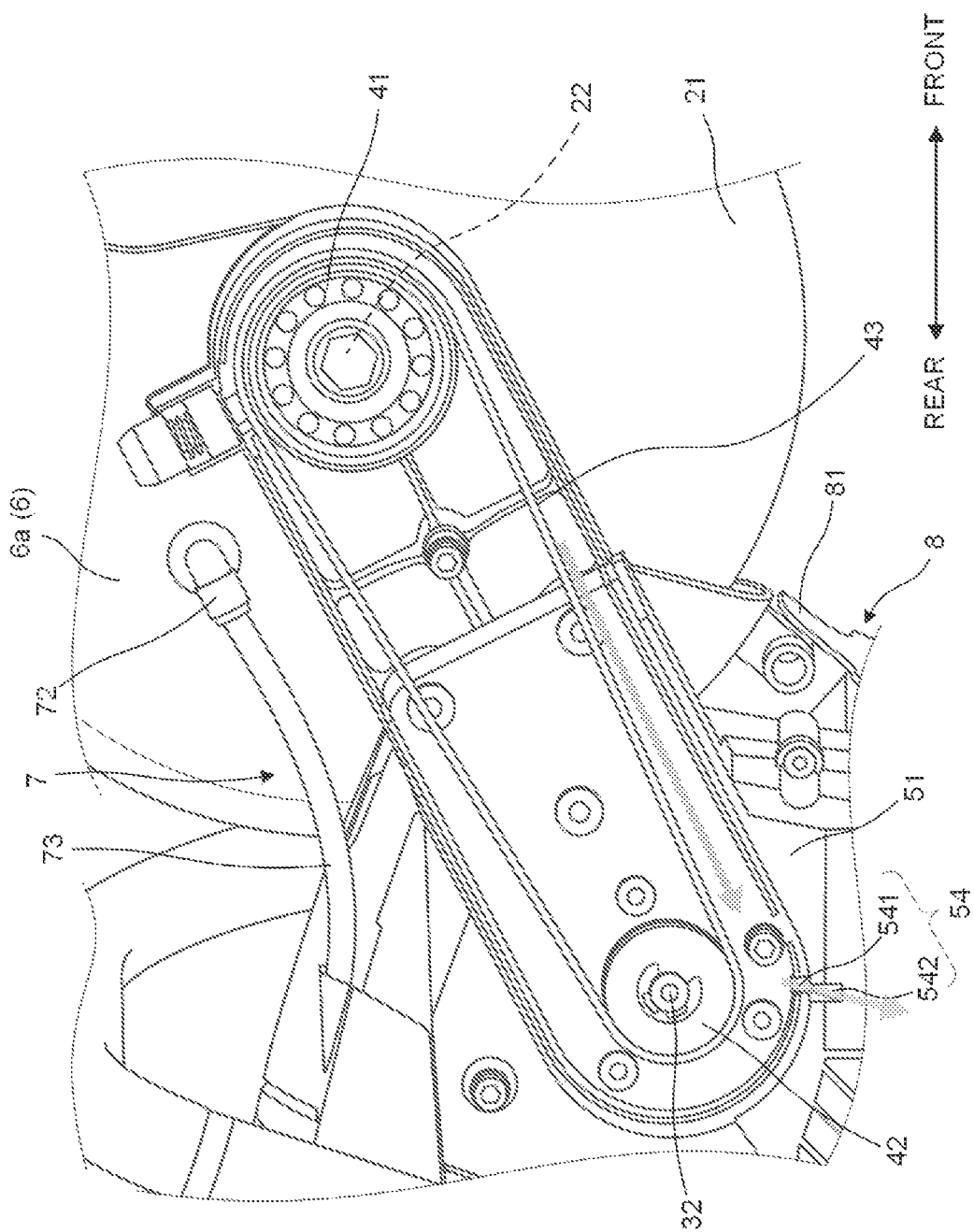
FIG. 3 is a side view showing a state in which a belt cover is removed.
Figure 5:
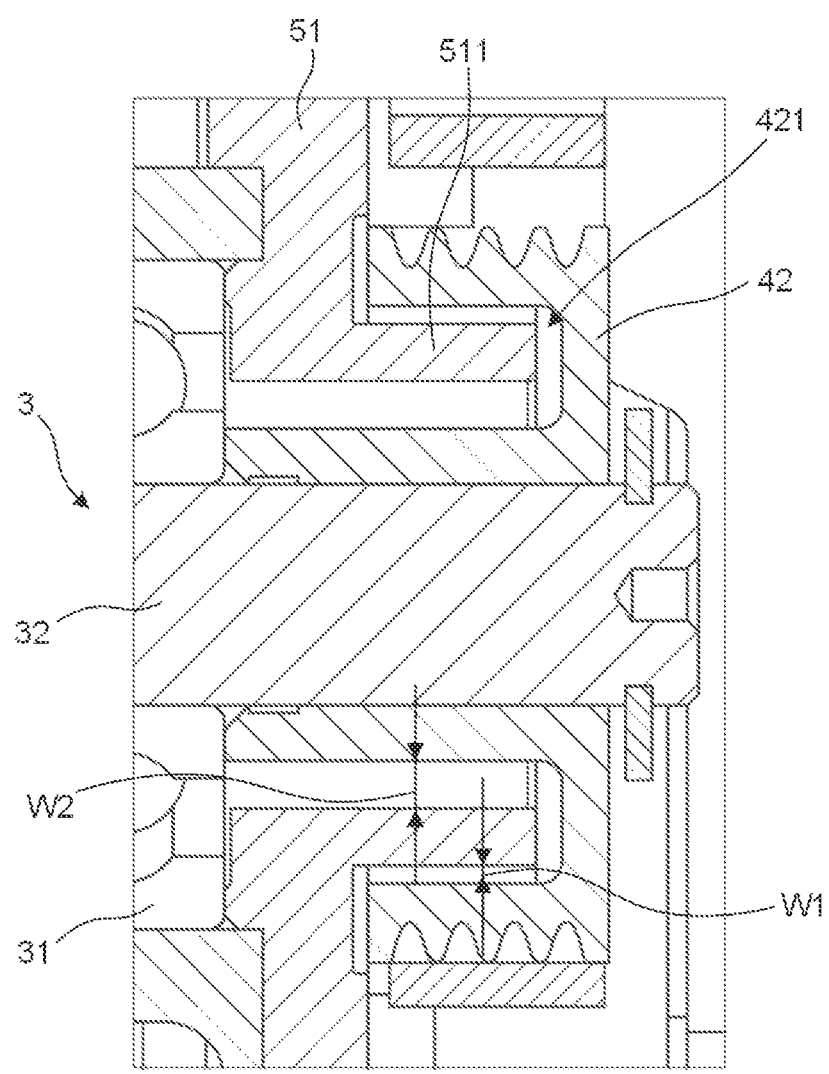
FIG. 5 is an enlarged cross-sectional view showing a vicinity of a second pulley.
Figure 6:
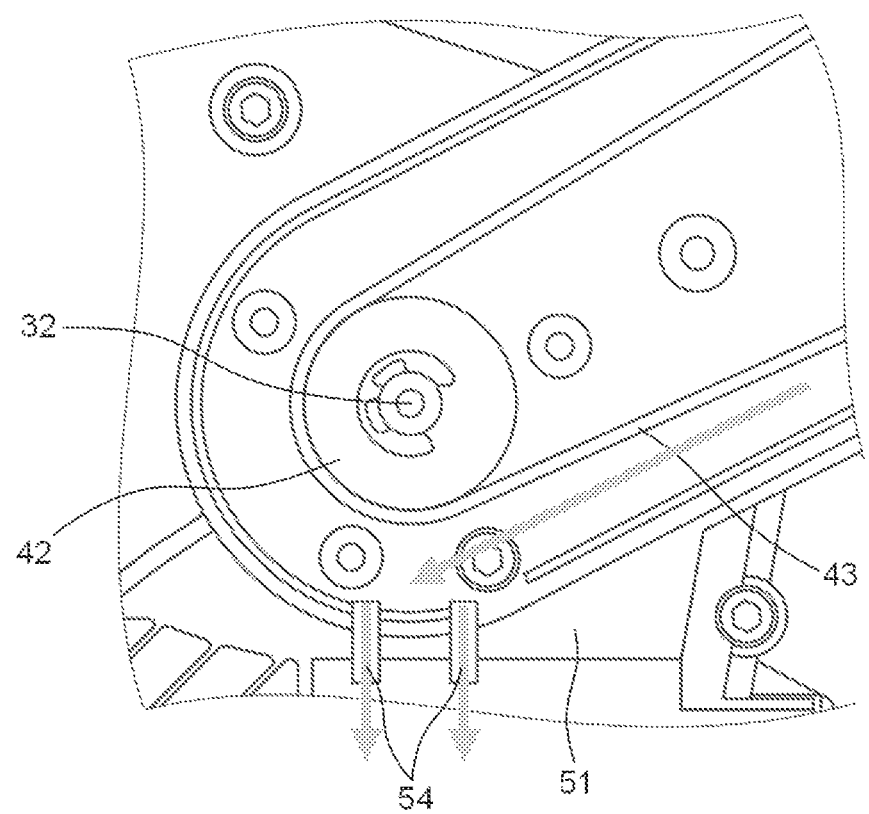
FIG. 6 is a side view showing another configuration of a communication portion.

FIG. 1 is a perspective view of a portable cutting machine viewed from a right side. FIG. 2 is a perspective view of the portable cutting machine viewed from a left side. FIG. 3 is a side view showing a state in which a belt cover is removed (slightly inclined). FIG. 4(a) is a partial cross-sectional view of a case and FIG. 4(b) is an enlarged cross-sectional view. FIG. 5 is an enlarged cross-sectional view showing a vicinity of a second pulley. FIG. 6 is a side view showing another configuration of a communication portion.

As shown in each drawing hereinafter, a front-back direction and a left-right direction are defined and illustrated.

The portable cutting machine according to the present invention is an apparatus that includes a cutting blade and configured to cut an object to be cut, such as concrete or asphalt, with the cutting blade.

The portable cutting machine 1 shown in FIG. 1, etc. comprises a cutting machine body 10, a front handle 20, and a rear handle 30.

The front handle 20 includes a grip rod 20a extending in a left-right direction and positioned above a front side of the cutting machine body 10, a first support rod 20b extending from a right end of the grip rod 20a diagonally downward to a rear side and fixed to a lower part of the cutting machine body 10, and a second support rod 20c extending from a left end of the grip rod 20a diagonally downward to a front side and fixed to the lower part of the cutting machine body 10. An operator can lift the cutting machine body 10 by grasping the grip rod 20a.

The rear handle 30 has a U-shape and both ends thereof are fixed to a rear side of the cutting machine body 10. The rear handle 30 is provided with a throttle lever 30a adjusting rotation number of the cutting blade.

The cutting machine body 10 comprises a cutting portion 2, a motor (drive portion) 3, a transmission portion 4, and a case 5.

As shown in FIGS. 1 and 2, the cutting portion 2 includes a disc-shaped cutting blade 21 that cuts an object to be cut by rotating, and a first rotation axis 22 that serves as a rotation center of the cutting blade 21.

The cutting blade 21 can cut an object to be cut that touches the cutting blade 21 by rotating around the first rotation axis 22.

The motor 3 includes a drive source 31 including a magnet and a coil, and a second rotation axis 32 driving by drive of the drive source 31, as shown in FIGS. 4 and 5. Rotation number of the motor 3 (the second rotation axis 32) can be controlled by adjusting a degree of grip of the throttle lever 30a.

As shown in FIG. 3, the transmission portion 4 includes a first pulley 41 fixed to the first rotation axis 22, a second pulley 42 fixed to the second rotation axis 32, and a belt 43 looped around the first pulley 41 and the second pulley 42. The transmission portion 4 allows the belt 43 to rotate via the second pulley 42 by rotation of the motor 3 (the second rotation axis 32). The rotation of the belt 43 allows the first pulley 41 to rotate and allows the cutting blade 21 to rotate via the first rotation axis 22. In other words, the transmission portion 4 transmits a rotational force by the motor 3 to the cutting blade 21 (the cutting portion 2).

The motor 3 and the transmission portion 4 are stored in the case 5.

The case 5 includes a housing 51 and a belt cover (a first cover) 52 detachably attached to the housing 51.

The housing 51 stores the motor (the drive portion) 3.

The belt cover 52 is attached to the housing 51 so as to cover the transmission portion 4, and a belt chamber (a storage space) 520 is formed between the housing 51 and the belt cover 52. The transmission portion 4 is stored in the belt chamber 520.

When cutting an object to be cut such as concrete or asphalt with the portable cutting machine 1, a cutting operation thereof is performed while supplying water (liquid) to the cutting blade 21 in order to reduce dust generation.

In the present embodiment, the housing 51 and the belt cover 52 are in direct contact. In other words, no sealing member (such as a liquid seal) is arranged between the housing 51 and the belt cover 52.

Furthermore, the belt cover 52 is fixed to the housing 51 with a plurality of fixing bolts (fixing portions) 53 (three in the present embodiment). An installation number of the fixing bolts 53 may be other than three, preferably five or less, and more preferably three or less.

According to such a configuration, water is allowed to enter the belt chamber 520. In other words, sealing property (liquid tightness) of the belt chamber 520 is low. In this case, there is a risk that water may accumulate in the belt chamber 520 and cause the belt 43 to slip against the second pulley 42, but on the other hand, there is an advantage that ease of assembly or maintenance of the portable cutting machine 1 can be improved.

To eliminate the above concerns, a communication portion 54 that is connected to the belt chamber 520 and open to outside of the portable cutting machine 1 (the belt chamber 520) is provided. Through the communication portion 54, water that has entered the belt chamber 520 can be discharged to outside of the portable cutting machine 1. As a result, it is possible to prevent difficulty in cutting the object to be cut due to slipping of the belt 43 while maintaining good ease of assembly or maintenance of the portable cutting machine 1.

In particular, the communication portion 54 is configured to allow water that has entered the belt chamber 520 to be discharged when the portable cutting machine 1 is in a upright state.

Here, "the portable cutting machine 1 in a upright state" refers to a state in which the cutting machine body 10 is placed on a ground or on a mounting table with the front handle 20 upward.

Therefore, it is preferable to provide the communication portion 54 below the case 5. In the present embodiment, the communication portion 54 is positioned below the belt 43 when the portable cutting machine 1 is in the upright state. This allows water that has entered the belt chamber 520 to be discharged smoothly to outside of the portable cutting machine 1, as indicated by an arrow in FIG. 3.

Further, in the present embodiment, the second pulley 42 is configured to be positioned below the first pulley 41 when the portable cutting machine 1 is in the upright state. That is, the belt cover 52 (the belt chamber 520) is inclined so as to be positioned lower at a rear side than at a front side when the portable cutting machine 1 is in the upright state. Thus, water entering the belt chamber 520 is more likely to be gathered and accumulated on the second pulley 42 side.

Therefore, in particular, the communication portion 54 is provided to be positioned below the second pulley 42 when the portable cutting machine 1 is in the upright state. Such a configuration allows water entering the belt chamber 520 to be gathered toward the communication portion 54 and more smoothly discharged to outside of the portable cutting machine 1.

Specifically, the communication portion 54 is configured of a groove formed by recessing from an outer surface of the housing 51 toward a side opposite to the belt chamber 520. According to such a configuration, the communication portion 54 can be formed relatively easily without reducing mechanical strength of the case 5.

As shown in FIG. 4(b), the groove includes a first bottom surface 541 that extends along an up-down direction and a second bottom surface 542 that is continuous with the first bottom surface 541 and inclines downward from an inside to an outside of the portable cutting machine 1 when the portable cutting machine 1 is in the upright state. This makes it easier for water that has entered the belt chamber 520 to move more smoothly along the second bottom surface 542 (inclined surface), as indicated by a double-dotted arrow in FIG. 4(b).

The belt cover 52 includes a lower side wall 521 that is positioned downward when the portable cutting machine 1 is in the upright state, as shown in FIG. 4(b). The lower side wall 521 includes an inner surface 521a that inclines downward from the outside to the inside of the portable cutting machine 1. This allows water that has entered the belt chamber 520 to be moved toward the communication portion 54 and gathered.

Both the inner surface 521a and an outer surface 521b of the lower side wall 521 incline downward from the outside to the inside of the portable cutting machine 1, but only the inner surface 521a may incline.

An opening area of the communication portion 54 (an area of a region 543 demarcated by the first bottom surface 541 and a side surface defining the communication portion 54 and a left end surface of the lower side wall 521) is preferably set to a size that allows passage of water that has entered the belt chamber 520 but prevents passage of water containing dust generated from the object to be cut.

The second pulley 42 includes an annular recess 421 formed along a circumferential direction around the second rotation axis 32, as shown in FIG. 5. Further, the housing 51 includes a annular protrusion 511 inserted into the recess 421 in a spaced apart state. With such a configuration, length of a gap formed between the second pulley 42 and the housing 51 can be increased. Therefore, it is possible to suitably prevent water (or water containing dust) that has entered the belt chamber 520 from entering the motor 3 side and causing the motor 3 to malfunction.

In the present embodiment, a separation distance between the recess 421 and the protrusion 511 is larger on an inside (W2 in drawing) than on an outside (W1 in drawing) in a radial direction thereof. In this case, even if water enters between the recess 421 and the protrusion 511, since a space is larger on the inside than on the outside in the radial direction, capillary phenomenon is inhibited, and further inward movement is restricted (limited).

From a viewpoint of preventing water from entering between the recess 421 and the protrusion 511, for instance, a liquid repellent treatment may be applied to an inner surface of the recess 421 and/or an outer surface of the protrusion 511.

Such a portable cutting machine 1 further comprises a protective cover (a second cover) 6 that covers part of the cutting blade 21.

As shown in FIGS. 1 and 2, the protective cover 6 includes a semicircular first side wall 6a and a semicircular second side wall 6b positioned on both sides of the cutting blade 21, and a curved third side wall 6c that connects the first side wall 6a and the second side wall 6b on a rear side.

A portion enclosed by the first side wall 6a, the second side wall 6b, and the third side wall 6c is a housing recess opening to a front side of the portable cutting machine 1, and the housing recess accommodates almost half of a rear side of the cutting blade 21. That is, the protective cover 6 covers almost half of the rear side of the cutting blade 21.

By providing such a protective cover 6, an opportunity for an operator to directly touch the cutting blade 21 can be more reliably reduced. Further, it also reduces splashing of water supplied to the cutting blade 21 to unwanted place.

The water to be supplied when cutting the object to be cut may be supplied from a water supply mechanism (liquid supply mechanism) provided separately from the portable cutting machine 1, but the portable cutting machine 1 in the present embodiment comprises a water supply mechanism (liquid supply mechanism) 7 that supplies water (liquid) to the cutting blade 21. By comprising the portable cutting machine 1 with such a water supply mechanism 7, it is possible for a single operator to cut the object to be cut while preventing scattering of dust.

Specifically, the water supply mechanism 7 includes a connecting portion 71 that can be connected to an external water supply source, a water supply port 72 provided on the first side wall 6a of the protective cover 6, and a connecting tube 73 that connects the connecting portion 71 and the water supply port 72. A valve 711 capable of adjusting an amount of water supply is provided in a middle of the connecting portion 71.

Further, the portable cutting machine 1 comprises an obstruction plate 8 provided at a lower front side of the case 5. The obstruction plate 8 includes a portion 81 protruding from a lower part of the case 5 toward a lower part of the protective cover 6 when the portable cutting machine 1 is in the upright state. The obstruction plate 8 includes a function to prevent water from reaching the case 5 when cutting the object to be cut. This allows for better prevention of water from entering the belt chamber 520.

A power switch (not shown) to turn on/off power supply to the portable cutting machine 1, a condition setting portion (not shown) to set an operating condition of the portable cutting machine 1, or the like are provided on an upper part of the case 5.

Moreover, a control board (not shown) configured to control an operation of the motor 3 is built inside the case 5. The control board is mounted with an arithmetic element and a memory element.

The arithmetic element is configured of, for instance, a CPU (Central Processing Unit), an MPU (Micro Processing Unit), or the like. The arithmetic element reads a predetermined program stored in the storage element to realize various functions related to the portable cutting machine 1. In other words, information processing by software stored in the storage element is specifically realized by the arithmetic element.

Note that the arithmetic element is not limited to a single one, and a plurality of arithmetic elements may be provided for each function. A combination thereof may be applied as well.

The storage element stores various information as defined by the foregoing description. This may be implemented by, for instance, an SSD (Solid State Drive) that stores various programs or the like related to the portable cutting machine 1 that is executed by the arithmetic element, or a memory such as a RAM (Random Access RAM) that store temporarily necessary information (argument, array, etc.) related to program operation.

In addition, the storage element stores various programs, variables, etc. related to the portable cutting machine 1 executed by the arithmetic element.

With such a portable cutting machine 1, an operator lifts up the cutting machine body 10 by grasping the grip rod 20a with one hand, positions the cutting blade 21 downward, grasps the rear handle 30 with the other hand, and operates the throttle lever 30a. Therefore, it is possible to cut an object to be cut by pressing the cutting blade 21 against the object to be cut while controlling the rotation number of the cutting blade 21.

According to the portable cutting machine 1 described above, water can be allowed to enter the belt chamber 520 while water that has entered the belt chamber 520 can be discharged outside the portable cutting machine 1 through the communication portion 54. As a result, it is possible to prevent difficulty in cutting the object to be cut due to slipping of the belt 43 while preventing deterioration of the ease of assembly or maintenance of the portable cutting machine 1.

Although the portable cutting machine 1 shows a configuration in which one communication portion 54 is provided in the case 5, the case 5 may be provided with two (a plurality of) communication portions 54, as shown in FIG. 6. Furthermore, the communication portion 54 may be provided through the belt cover 52, and an arrangement position is not limited to the position shown in drawing.

In addition, the present invention may be provided with each of the following aspects.

The portable cutting machine, wherein: the communication portion is configured to allow the liquid that has entered the storage space to be discharged when the portable cutting machine is in an upright state.

The portable cutting machine, wherein: the communication portion is positioned below the belt when the portable cutting machine is in the upright state.

The portable cutting machine, wherein: the case includes a plurality of the communication portions.

The portable cutting machine, wherein: the second pulley is positioned below the first pulley when the portable cutting machine is in the upright state.

The portable cutting machine, wherein: the communication portion is positioned below the second pulley when the portable cutting machine is in the upright state.

The portable cutting machine, wherein: the case includes a housing that houses the drive portion and a first cover that forms the storage space between the housing and the first cover, and the communication portion includes a groove formed by recessing from an outer surface of the housing toward a side opposite to the storage space.

The portable cutting machine, wherein: the groove includes a first bottom surface that extends along an up-down direction and a second bottom surface that is continuous with the first bottom surface and inclines downward from an inside to an outside of the portable cutting machine when the portable cutting machine is in the upright state.

The portable cutting machine, wherein: the first cover includes a lower side wall that is positioned downward when the portable cutting machine is in the upright state, and the lower side wall includes an inner surface that inclines downward from the outside to the inside of the portable cutting machine.

The portable cutting machine, wherein: the housing and the first cover are in direct contact.

The portable cutting machine, wherein: the case further includes a plurality of fixing portions for fixing the first cover to the housing, and an installation number of the fixing portions is five or less.

The portable cutting machine, wherein: the second pulley includes an annular recess formed along a circumferential direction around the second rotation axis, and the housing includes an annular protrusion inserted into the recess in a spaced apart state.

The portable cutting machine, wherein: a separation distance between the recess and the protrusion is greater on an inside than on an outside in a radial direction thereof.

The portable cutting machine, wherein: the drive portion is a motor.

The portable cutting machine, further comprising: a liquid supply mechanism configured to supply the liquid to the cutting blade.

The portable cutting machine, further comprising: a second cover provided to cover part of the cutting blade, and an obstruction plate including a portion protruding from a lower part of the case toward a lower part of the second cover when the portable cutting machine is in the upright state and configured to prevent the liquid from reaching the case.

Of course, the above aspects are not limited thereto.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

For example, when the object to be cut (processed object) by the portable cutting machine 1 is a metal product such as a metal pave, liquid supplied to the cutting blade 21 may be oil or the like. In this case, friction generated during cutting of the metal product can be reduced and heat generation can be suppressed.

Moreover, the drive portion may be configured by an engine.

What is claimed is:

1. A portable cutting machine, comprising:
   a cutting portion including a disc-shaped cutting blade that cuts an object to be cut by rotating, and a first rotation axis that serves as a rotation center of the cutting blade;
   a drive portion including a drive source and a second rotation axis rotating by drive of the drive source;
   a transmission portion including a first pulley fixed to the first rotation axis, a second pulley fixed to the second rotation axis, and a belt looped around the first pulley and the second pulley, and configured to transmit a rotational force by the drive portion to the cutting portion; and
   a case including a storage space for storing the transmission portion and at least one communication portion that connect to the storage space and open to outside; wherein
   the storage space is configured to allow liquid to enter and to allow the liquid that has entered the storage space to be discharged to outside via the communication portion.

2. The portable cutting machine according to claim 1, wherein:
   the communication portion is configured to allow the liquid that has entered the storage space to be discharged when the portable cutting machine is in an upright state.

3. The portable cutting machine according to claim 1, wherein:
   the communication portion is positioned below the belt when the portable cutting machine is in an upright state.

4. The portable cutting machine according to claim 1, wherein:
   the case includes a plurality of the communication portions.

5. The portable cutting machine according to claim 1, wherein:
   the second pulley is positioned below the first pulley when the portable cutting machine is in an upright state.

6. The portable cutting machine according to claim 5, wherein:
   the communication portion is positioned below the second pulley when the portable cutting machine is in the upright state.

7. The portable cutting machine according to claim 1, wherein:
   the case includes a housing that houses the drive portion and a first cover that forms the storage space between the housing and the first cover, and
   the communication portion includes a groove formed by recessing from an outer surface of the housing toward a side opposite to the storage space.

8. The portable cutting machine according to claim 7, wherein:
   the groove includes a first bottom surface that extends along an up-down direction and a second bottom surface that is continuous with the first bottom surface and inclines downward from an inside to an outside of the portable cutting machine when the portable cutting machine is in an upright state.

9. The portable cutting machine according to claim 7, wherein:
the first cover includes a lower side wall that is positioned downward when the portable cutting machine is in the upright state, and
the lower side wall includes an inner surface that inclines downward from an outside to an inside of the portable cutting machine.

10. The portable cutting machine according to claim 7, wherein:
the housing and the first cover are in direct contact.

11. The portable cutting machine according to claim 7, wherein:
the case further includes a plurality of fixing portions for fixing the first cover to the housing, and
an installation number of the fixing portions is five or less.

12. The portable cutting machine according to claim 1, wherein:
the second pulley includes an annular recess formed along a circumferential direction around the second rotation axis, and
the housing includes an annular protrusion inserted into the recess in a spaced apart state.

13. The portable cutting machine according to claim 12, wherein:
a separation distance between the recess and the protrusion is greater on an inside than on an outside in a radial direction thereof.

14. The portable cutting machine according to claim 1, wherein:
the drive portion is a motor.

15. The portable cutting machine according to claim 1, further comprising:
a liquid supply mechanism configured to supply the liquid to the cutting blade.

16. The portable cutting machine according to claim 1, further comprising:
a second cover provided to cover part of the cutting blade, and
an obstruction plate including a portion protruding from a lower part of the case toward a lower part of the second cover when the portable cutting machine is in an upright state and configured to prevent the liquid from reaching the case.

* * * * *